US008949415B2

(12) United States Patent
Abuelsaad et al.

(10) Patent No.: US 8,949,415 B2
(45) Date of Patent: Feb. 3, 2015

(54) ACTIVITY-BASED VIRTUAL MACHINE AVAILABILITY IN A NETWORKED COMPUTING ENVIRONMENT

(75) Inventors: Kelly Abuelsaad, Poughkeepsie, NY (US); Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/343,233

(22) Filed: Jan. 4, 2012

(65) Prior Publication Data

US 2013/0173781 A1      Jul. 4, 2013

(51) Int. Cl.
*G06F 15/173*      (2006.01)

(52) U.S. Cl.
USPC ............ 709/224; 718/105; 370/252; 370/392

(58) Field of Classification Search
USPC .................... 709/224; 718/105; 370/252, 392
See application file for complete search history.

(56) References Cited

U.S. PATENT DOCUMENTS

| | | | |
|---|---|---|---|
| 6,880,002 B2 | 4/2005 | Hirschfeld et al. | |
| 8,102,781 B2 * | 1/2012 | Smith ............................ | 370/252 |
| 2008/0104608 A1 * | 5/2008 | Hyser et al. .................... | 718/105 |
| 2009/0276771 A1 | 11/2009 | Nickolov et al. | |
| 2009/0300149 A1 | 12/2009 | Ferris et al. | |
| 2011/0055830 A1 | 3/2011 | Kamay et al. | |
| 2011/0307887 A1 | 12/2011 | Huang et al. | |
| 2012/0063458 A1 * | 3/2012 | Klink et al. ................... | 370/392 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
Lin, C.-C. et al., "Energy-efficient Virtual Machine Provision Algorithms for Cloud Systems", Academia Sinica, Jul. 4, 2011, 8 pages.
Von Laszewski, G. et al., "Power-Aware Scheduling of Virtual Machines in DVFS-enabled Clusters", Indiana University, Aug. 31, 2009, 9 pages.
"vSecurity®; Comprehensive Security and Compliance for Virtual and Cloud Data Centers", 5 pages. No authors cited. Publication date not cited. http://www2.catbird.com/our_services/vsecurity_home.php.

* cited by examiner

*Primary Examiner* — Yves Dalencourt
(74) *Attorney, Agent, or Firm* — William E. Schiesser; Hunter F. Webb; Keohane & D'Alessandro PLLC

(57) ABSTRACT

An approach for activity-based virtual machine (VM) availability in a networked computing environment (e.g., a cloud computing environment) is provided. In a typical embodiment, a system provided under the present approach monitors and logs network traffic and performs network packet inspections. Based on the contents of the network packets, the system may determine which applications/processes on particular VMs that are associated with the traffic. Users of this system may configure rules and thresholds. Regardless, if an availability threshold is not met as compared to a volume of network traffic, certain network traffic disablement actions can be taken. Users may also configure those conditions that will result in re-enablement of the network and/or processes that were disabled.

22 Claims, 7 Drawing Sheets

ACTIVITY-BASED VIRTUAL MACHINE AVAILABILITY IN A NETWORKED COMPUTING ENVIRONMENT

TECHNICAL FIELD

The present invention generally relates to virtual machine (VM) availability. Specifically, the present invention relates to activity-based VM availability control in a network computing environment (e.g., a cloud computing environment)

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud service providers may choose to segment pricing into granular categories (e.g., if a consumer creates a VM in a cloud environment), that user may be charged not only for the minutes/hours that the VM runs, but the provider may also charge for the amount of data transferred over the network to/from that VM. As such, a user should be able to take steps to conserve network bandwidth where and when the user deems necessary. Challenges may exist, however, in that current solutions typically rely on a manual shut-down of processes, applications, and/or VMs. Moreover, such approaches may require the user to manually re-enable the processes, applications, and/or VMs when the VM is later needed.

SUMMARY

In general, embodiments of the present invention provide an approach for activity-based virtual machine (VM) availability in a networked computing environment (e.g., a cloud computing environment). In a typical embodiment, a system provided under the present approach monitors and logs network traffic and performs network packet inspections. Based on the contents of the network packets, the system may determine which applications/processes on particular VMs that are associated with the traffic. Users of this system may configure rules and thresholds (e.g., based on traffic of a specific type, traffic bound for a specific type of application running on a server, etc.). Regardless, if an availability threshold is not met as compared to a volume of network traffic, certain network traffic disablement actions can be taken (e.g., blocking network traffic to the VM, issuing a stop/exit command to a process on the VM, etc.). Users may also configure those conditions that will result in re-enablement of the network and/or processes that were disabled.

A first aspect of the present invention provides a computer-implemented method for activity-based virtual machine (VM) availability control in a networked computing environment, comprising: monitoring network traffic through a VM on a host machine in the networked computing environment; performing a packet inspection of the network traffic to identify a set of processes of the VM that are associated with the network traffic; comparing a volume of the network traffic associated with the set of processes to an availability threshold; and responsive to the volume falling below the availability threshold, performing a network traffic disablement action with respect to the VM.

A second aspect of the present invention provides a computer-implemented method for activity-based virtual machine (VM) availability control in a networked computing environment, comprising: a memory medium comprising instructions; a bus coupled to the memory medium; and a processor coupled to the bus that when executing the instructions causes the system to: monitor network traffic through a VM on a host machine in the networked computing environment; perform a packet inspection of the network traffic to identify a set of processes of the VM that are associated with the network traffic; compare a volume of the network traffic associated with the set of processes to an availability threshold; and responsive to the volume falling below the availability threshold, perform a network traffic disablement action with respect to the VM.

A third aspect of the present invention provides a computer program product for activity-based virtual machine (VM) availability control in a networked computing environment, the computer program product comprising a computer readable storage media, and program instructions stored on the computer readable storage media, to: monitor network traffic through a VM on a host machine in the networked computing environment; perform a packet inspection of the network traffic to identify a set of processes of the VM that are associated with the network traffic; compare a volume of the network traffic associated with the set of processes to an availability threshold; and responsive to the volume falling below the availability threshold, perform a network traffic disablement action with respect to the VM.

A fourth aspect of the present invention provides a method for deploying a system for activity-based virtual machine (VM) availability control in a networked computing environment, comprising: deploying a computer infrastructure being operable to: monitor network traffic through a VM on a host machine in the networked computing environment; perform a packet inspection of the network traffic to identify a set of processes of the VM that are associated with the network traffic; compare a volume of the network traffic associated with the set of processes to an availability threshold; and responsive to the volume falling below the availability threshold, perform a network traffic disablement action with respect to the VM.

BRIEF DESCRIPTION OF THE DRAWINGS

These and other features of this invention will be more readily understood from the following detailed description of the various aspects of the invention taken in conjunction with the accompanying drawings in which.

Figure 1:
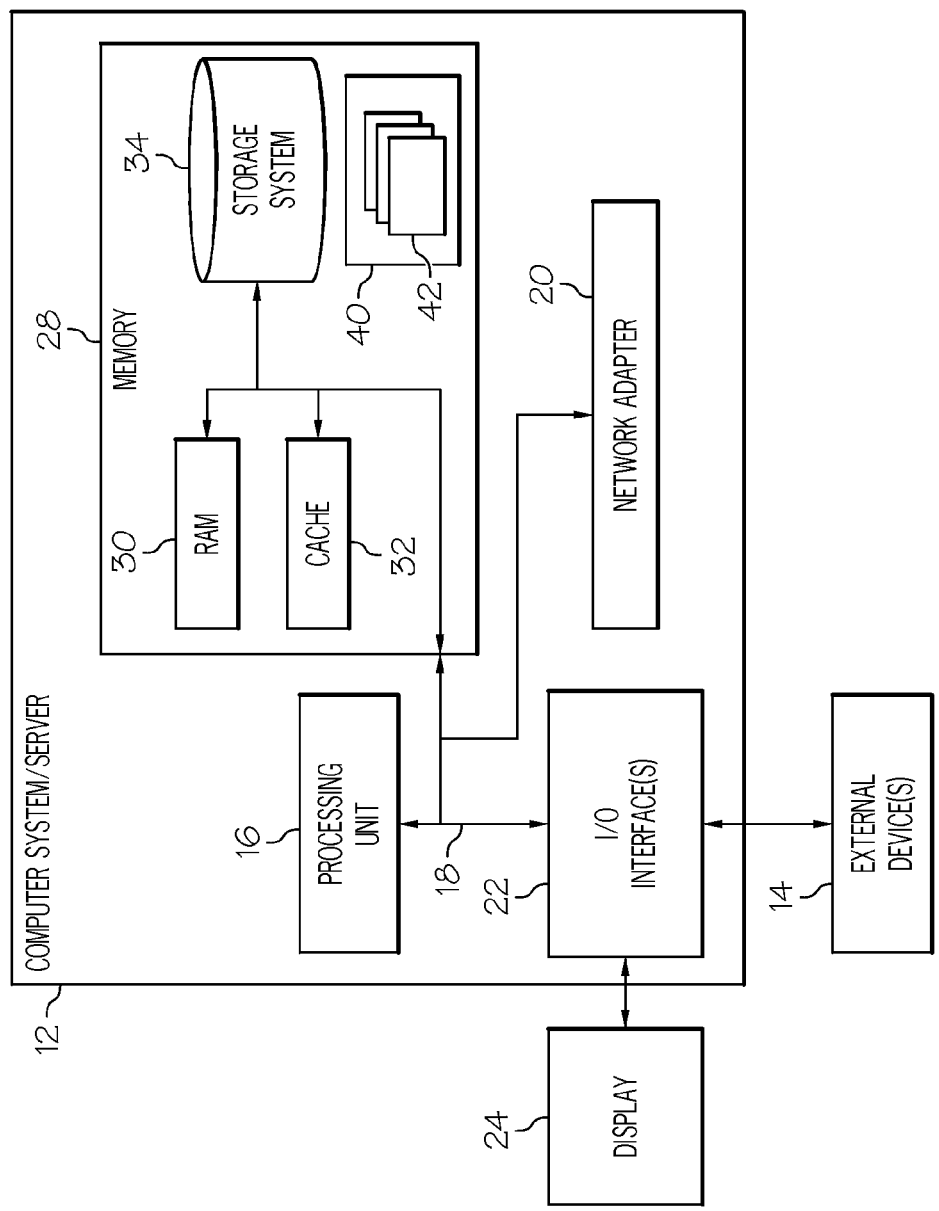
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for activity-based virtual machine (VM) availability in a networked computing environment (e.g., a cloud computing environment). In a typical embodiment, a system provided under the present approach monitors and logs network traffic and performs network packet inspections. Based on the contents of the network packets, the system may determine which applications/processes on particular VMs that are associated with the traffic. Users of this system may configure rules and thresholds (e.g., based on traffic of a specific type, traffic bound for a specific type of application running on a server, etc.). Regardless, if an availability threshold is not met as compared to a volume of network traffic, certain network traffic disablement actions can be taken (e.g., blocking network traffic to the VM, issuing a stop/exit command to a process on the VM, etc.). Users may also configure those conditions that will result in re-enablement of the network and/or processes that were disabled.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
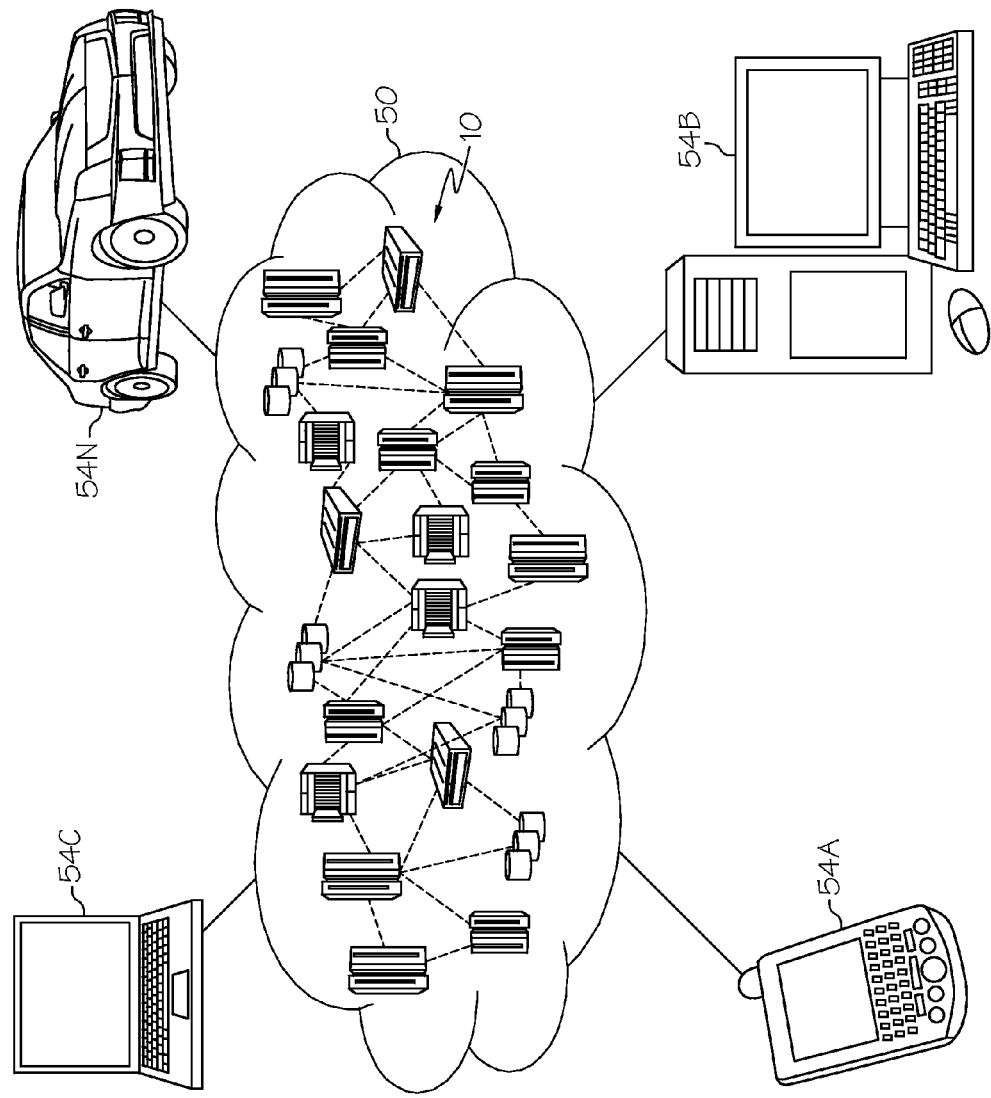
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
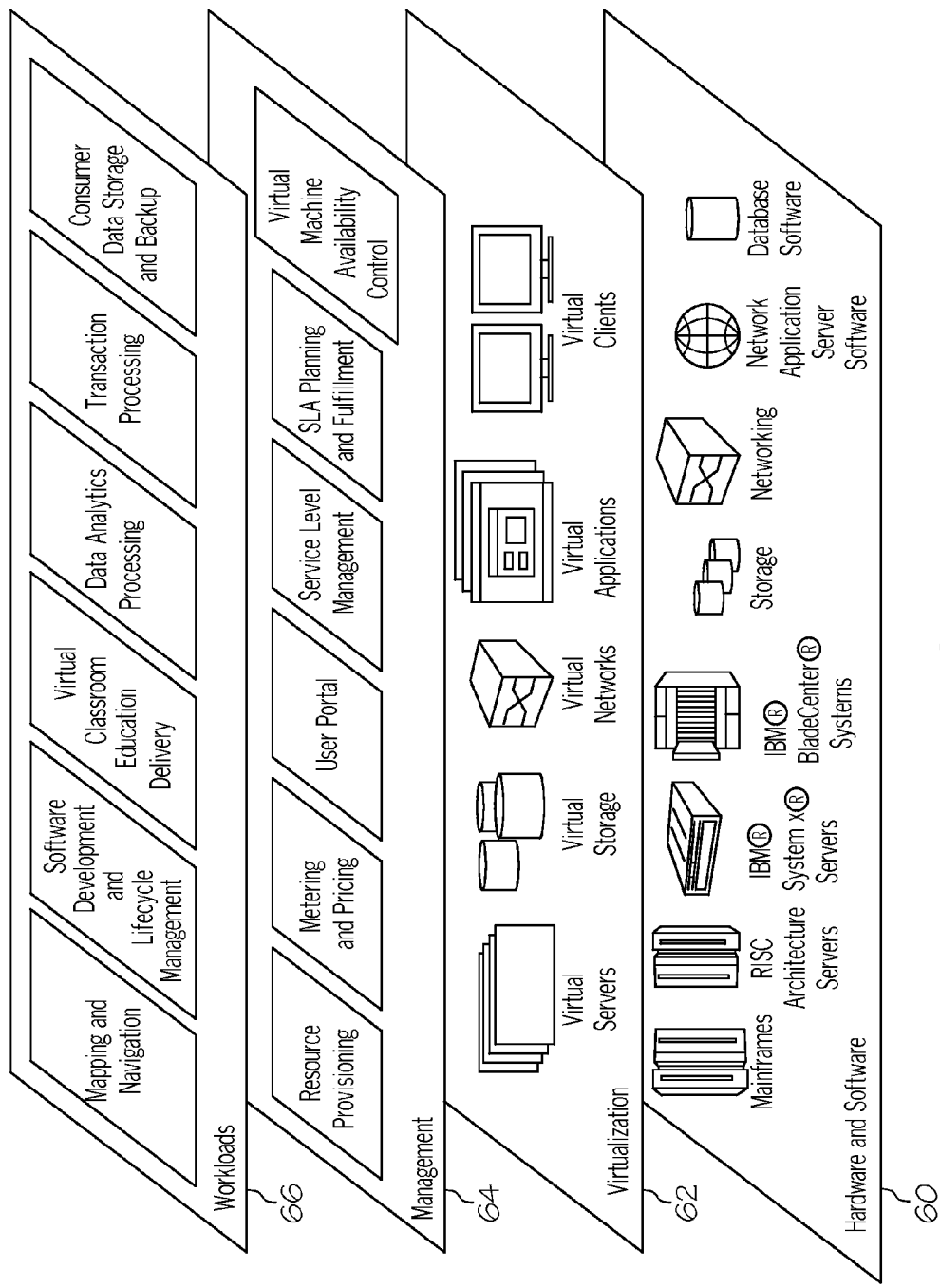
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual machine availability control, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine availability control functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
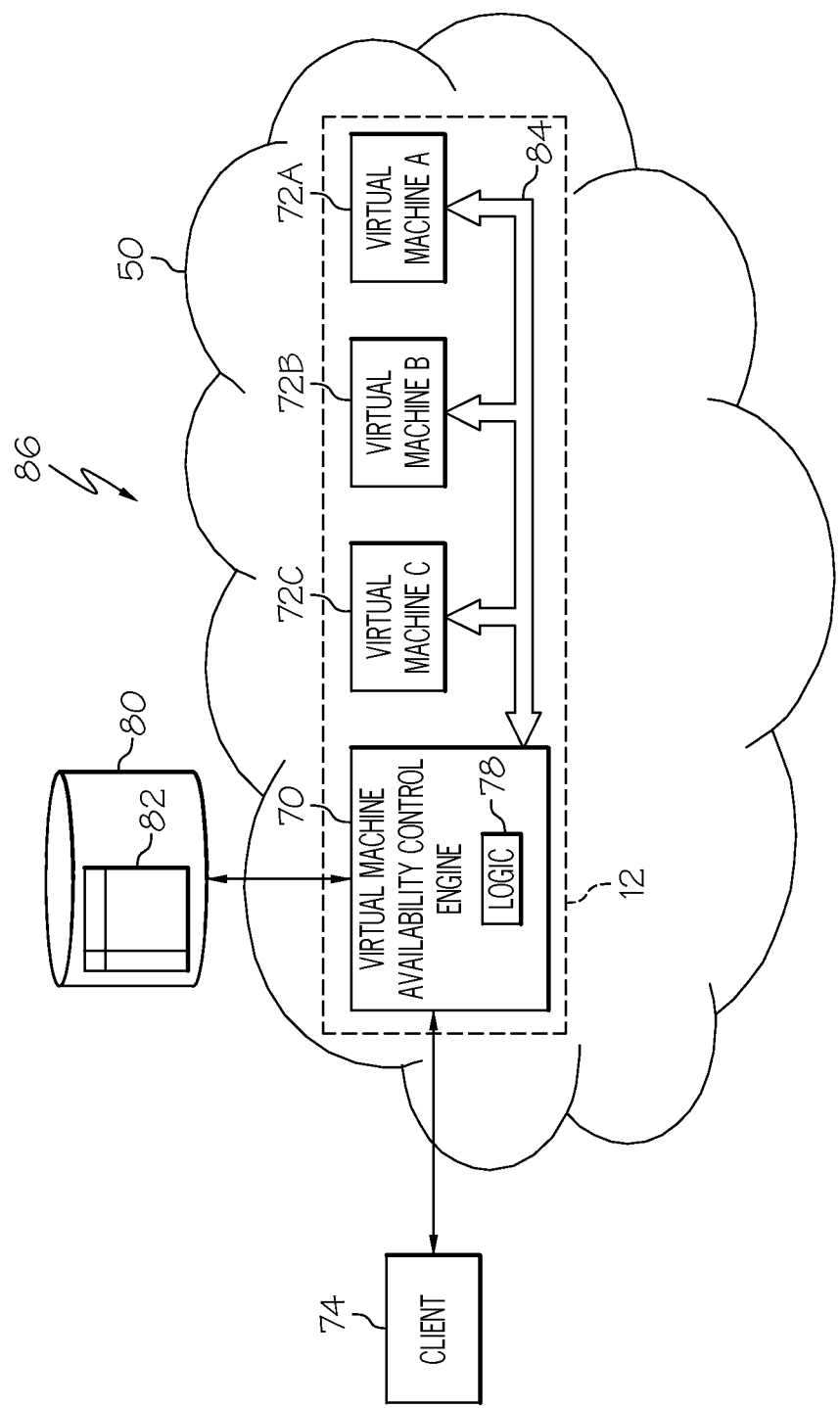
FIG. 4 depicts a system diagram according to an embodiment of the present invention.

Referring now to FIG. 4, a system diagram capable of implementing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a virtual machine availability control engine (engine 70). Rather, engine 70 could be loaded on a server or server-capable device that communicates (e.g., wirelessly) with the clients to provide device protection therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of logic 78 and/or provides virtual machine availability control hereunder.

Along these lines, engine 70 may perform multiple functions similar to a general-purpose computer. Specifically, among other functions, engine 70 may (among other things): monitor network traffic 84 through a VM 72C (of a set of VMs 72A-C) on a system/server (also referred to herein as host machine 12) communicating with a client 74 in the networked computing environment 86; perform a packet inspection of the network traffic 84 to identify a set of processes of the VM 72C that are associated with the network traffic; compare a volume of the network traffic 84 associated with the set of processes to an availability threshold; responsive to the volume of network traffic 84 falling below the availability threshold, perform a network traffic 84 disablement action with respect to the VM 72C; responsive to volume of network traffic 84 through the VM 72C meeting the availability threshold, perform a network traffic 84 enablement action with respect to the VM 72C; provide the availability threshold in a set of rules/thresholds 82 stored in a computer storage medium 80; identifying a type of network traffic 84, or network traffic bound 84 for a particular process of the set of processes; and/or identify a set of applications of the VM 72C associated with the network traffic 84.

Illustrative Implementation

Referring to FIG. 4, an illustrative example of an implementation will be described in greater detail 1. Engine 70 may be installed on every host system 12.
2. Engine 70 may act as a virtual switch for traffic 84 being sent to/from VMs 72A-C running on the same host system 12.
    A. Engine 70's presence may be transparent to the user since it is just another network hop in the route to the VM.
    B. Engine 70 may also have the ability to perform packet inspection on all traffic that passes through it.
3. A user/client 74 may "opt-in" to have their network traffic 84 evaluated.
4. If the client 74 wishes to evaluate network traffic, the client 74 can also, optionally, configure rules and triggers based on the network traffic. For example, a customer may have a VM that is hosting an hypertext transfer protocol (HTTP) Web Server. The customer may configure the system to monitor incoming HTTP traffic that has "/mycloudsite" in the URI. If a predetermined amount of time has gone by and the uniform resource indicator (URI) has not been accessed, the service could block all network traffic to and from the VM except, for example, for port 22 secure shell procotol (SSH). This may conserve network bandwidth, since there may be other processes on the host 12 communicating over the network that the user does not deem essential, since the primary purpose of the machine is that of an HTTP Server. Alternatively, there may be users/clients 74 accessing the /mytestcloudsite2 URI, which the owner of the host 12 does not deem essential to be accessed by other users/clients.
5. A user/client 74 may configure a certain action to re-enable the state that was previously disabled.

For example, all traffic may have been blocked after no user had accessed /mycloudsite for the predetermined amount of time. The owner of the VM 72C can configure a rule that when another request is received to access /mycloudsite, all network traffic would again be re-enabled, and the request would go through.

Figure 5:
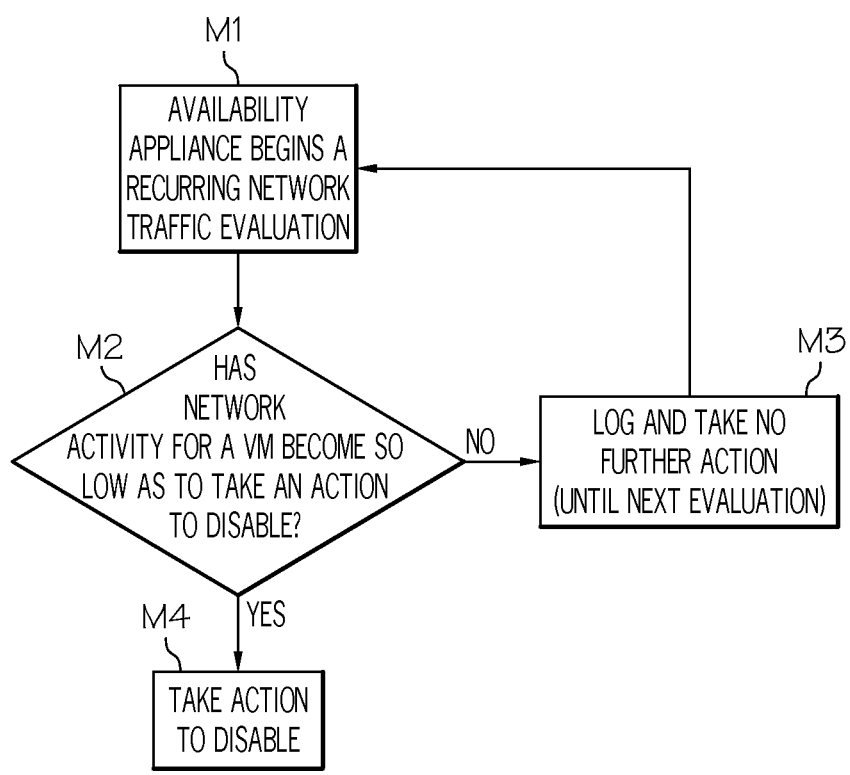
FIG. 5 depicts a method flow diagram according to an embodiment of the present invention.

Referring now to FIG. 5, a method flow diagram depicting the disablement of network traffic according to an embodiment of the present invention is shown. In step M1, an availability appliance (e.g., engine 70) begins a recurring network traffic evaluation. In step M2, it is determined whether network activity for a VM (e.g., VM 72C) has become so low as to take actions to disable. If not, the decision is logged, and no further action is taken until the next evaluation in step M3. If so, network traffic disablement action(s) can be taken in step M4.

Figure 6:
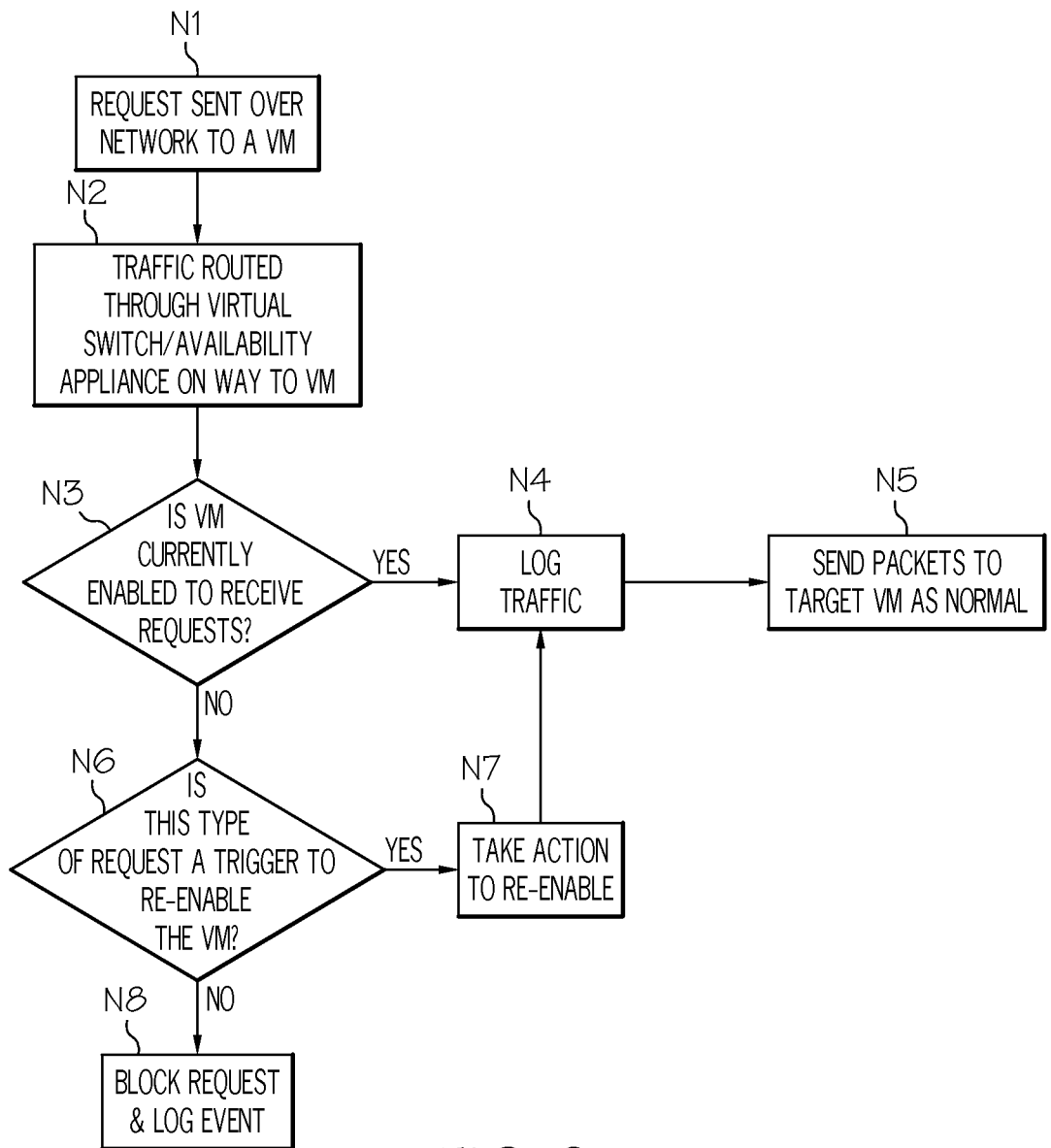
FIG. 6 depicts another method flow diagram according to an embodiment of the present invention.

Referring now to FIG. 6, a method flow diagram depicting the re-enablement of network traffic according to an embodiment of the present invention is shown. In step N1, a request is sent over a network to a VM. In step N2, traffic is routed through the availability appliance (engine 70) on the way to the VM. In step N3, it is determined whether that VM is currently enabled to receive requests. If so, the traffic is logged in step N4, and the packets are sent to the target VM as normal in step N5. If, however, the VM was not enabled to receive requests in step N3, it would be determined in step N6 whether the request is of a type to trigger re-enablement of the VM. If not, the request is blocked and the event logged in step N8. If so, action network traffic enablement action(s) will be taken in step N7, the traffic will be logged in step N4, and packets will be sent to the target VM as normal in step N5.

Figure 7:
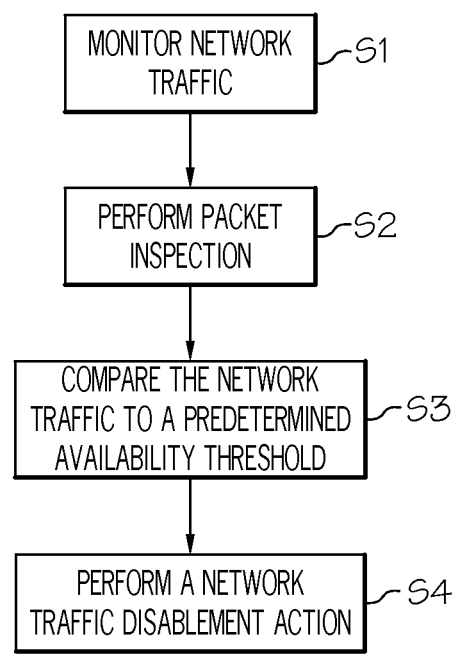
FIG. 7 depicts another method flow diagram according to an embodiment of the present invention.

Referring now to FIG. 7, a method flow diagram according to an embodiment of the present invention is shown. In step S1, network traffic through a VM on a host machine is monitored in the networked computing environment. In step S2, a packet inspection of the network traffic is performed to identify a set of processes of the VM that are associated with the network traffic. In step S3, a volume of the network traffic associated with the set of processes is compared to an availability threshold. In step S4, responsive to the volume falling below the availability threshold, a network traffic disablement action is performed with respect to the VM.

While shown and described herein as a virtual machine availability control solution, it is understood that the invention further provides various alternative embodiments. For example, in one embodiment, the invention provides a computer-readable/useable medium that includes computer program code to enable a computer infrastructure to provide virtual machine availability control functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide virtual machine availability control functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual machine availability control. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for activity-based virtual machine (VM) availability control in a networked computing environment, comprising:
   monitoring network traffic through a VM on a host machine in the networked computing environment;
   performing a packet inspection of the network traffic to identify a set of processes of the VM that are associated with the network traffic and a priority of the set of processes, the network traffic being specifically designated for the VM;
   comparing a volume of the network traffic associated with the set of processes to an availability threshold; and
   responsive to the volume of high priority network traffic falling below the availability threshold, conserving network bandwidth used by the VM by performing a network traffic disablement action with respect to network traffic to the VM and network traffic from the VM without disabling the VM.

2. The computer-implemented method of claim 1, further comprising, responsive to the volume meeting the availability threshold, performing a network traffic enablement action with respect to the VM.

3. The computer-implemented method of claim 1, further comprising providing the availability threshold in a set of rules stored in a computer storage device.

4. The computer-implemented method of claim 3, the set of rules identifying at least one of the following: a type of network traffic, or network traffic bound for a particular process of the set of processes.

5. The computer-implemented method of claim 1, the network traffic disablement action comprising at least one of the following: blocking network traffic through the VM, or stopping at least one of the set of processes.

6. The computer-implemented method of claim 1, the packet inspection further identifying a set of applications of the VM associated with the network traffic.

7. The computer-implemented method of claim 1, the networked computing environment comprising a cloud computing environment.

8. A system for activity-based virtual machine (VM) availability control in a networked computing environment, comprising:
   at least one memory device comprising instructions;
   a bus coupled to the at least one memory device; and
   a processor coupled to the bus that when executing the instructions causes the system to:
   monitor network traffic through a VM on a host machine in the networked computing environment;
   perform a packet inspection of the network traffic to identify a set of processes of the VM that are associated with the network traffic and a priority of each of the set of processes, the network traffic being specifically designated for the VM;
   compare a volume of the network traffic associated with the set of processes to an availability threshold; and
   responsive to the volume of high priority network traffic falling below the availability threshold, conserving network bandwidth used by the VM by performing a network traffic disablement action with respect to network traffic to the VM and network traffic from the VM without disabling the VM.

9. The system of claim 8, the at least one memory device further comprising instructions for causing the system to, responsive to the volume meeting the availability threshold, perform a network traffic enablement action with respect to the VM.

10. The system of claim 8, the at least one memory device further comprising instructions for causing the system to provide the availability threshold in a set of rules stored in a computer storage medium.

11. The system of claim 10, the set of rules identifying at least one of the following: a type of network traffic, or network traffic bound for a particular process of the set of processes.

12. The system of claim 8, the network traffic disablement action comprising at least one of the following: blocking network traffic through the VM, or stopping at least one of the set of processes.

13. The system of claim 8, the at least one memory device further comprising instructions for causing the system to identify a set of applications of the VM associated with the network traffic.

14. The system of claim 8, the networked computing environment comprising a cloud computing environment.

15. A computer program product for activity-based virtual machine (VM) availability control in a networked computing environment, the computer program product comprising a computer readable storage device, and program instructions stored on the computer readable storage device, to:
   monitor network traffic through a VM on a host machine in the networked computing environment;
   perform a packet inspection of the network traffic to identify a set of processes of the VM that are associated with the network traffic and a priority of each of the set of processes, the network traffic being specifically designated for the VM;
   compare a volume of the network traffic associated with the set of processes to an availability threshold; and responsive to the volume of high priority network traffic falling below the availability threshold, conserving network bandwidth used by the VM by performing a network traffic disablement action with respect to network traffic to the VM and network traffic from the VM without disabling the VM.

16. The computer program product of claim 15, the computer readable storage device further comprising instructions to, responsive to the volume meeting the availability threshold, perform a network traffic enablement action with respect to the VM.

17. The computer program product of claim 15, the computer readable storage device further comprising instructions to provide the availability threshold in a set of rules stored in a computer storage device.

18. The computer program product of claim 17, the set of rules identifying at least one of the following: a type of network traffic, or network traffic bound for a particular process of the set of processes.

19. The computer program product of claim 15, the network traffic disablement action comprising at least one of the following: blocking network traffic through the VM, or stopping at least one of the set of processes.

20. The computer program product of claim 15, the computer readable storage device further comprising instructions to identify a set of applications of the VM associated with the network traffic.

21. The computer program product of claim 15, the networked computing environment comprising a cloud computing environment.

22. A method for deploying a system for activity-based virtual machine (VM) availability control in a networked computing environment, comprising:

deploying a computer infrastructure being operable to:

monitor network traffic through a VM on a host machine in the networked computing environment;

perform a packet inspection of the network traffic to identify a set of processes of the VM that are associated with the network traffic and a priority of each of the set of processes, the network traffic being specifically designated for the VM;

compare a volume of the network traffic associated with the set of processes to an availability threshold; and responsive to the volume of high priority network traffic falling below the availability threshold, conserving network bandwidth used by the VM by performing a network traffic disablement action with respect to network traffic to the VM and network traffic from the VM without disabling the VM.

\* \* \* \* \*